A. RALSTON.
Churn.
No. 21,575.
Patented Sept. 21, 1858.
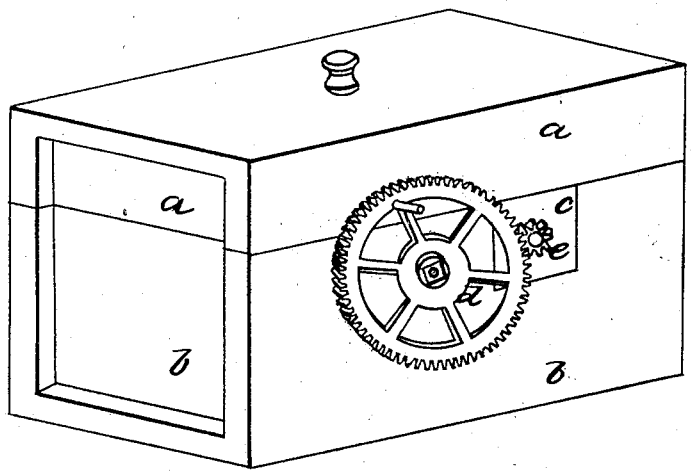
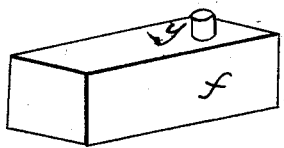
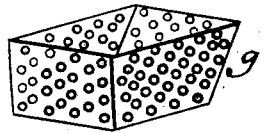
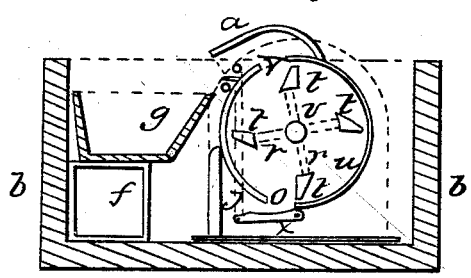
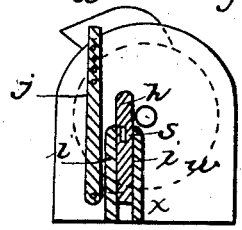

UNITED STATES PATENT OFFICE.

ANDREW RALSTON, OF WEST MIDDLETOWN, PENNSYLVANIA.

CHURN.

Specification of Letters Patent No. 21,575, dated September 21, 1858.

*To all whom it may concern:*

Be it known that I, ANDREW RALSTON, of West Middletown, in the county of Washington and State of Pennsylvania, have invented a new and Improved Churn; and I do hereby declare that the following is a full and exact description thereof, reference being had to the accompanying drawings and to the letters of reference marked thereon, similar letters referring to similar parts.

The nature of my invention consists in an arrangement for agitating, cutting, fanning and separating butter from the serous part of milk.

To enable others skilled in the art to make and use my invention, I will proceed to describe its construction and operation.

In the accompanying drawings, Figure 1, is a perspective view of the churn; Fig. 2, is a cut or sectional view; Fig. 3, is a side view of the case for the fan or beater; Fig. 4, is a perspective view of the heating or cooling vessel; Fig. 5, is a perspective view of the strainer, or gathering vessel.

In the accompanying drawings ($b$) is the case or reservoir of churn; ($a$) is the lid of the case ($b$); ($c$) is the journal boxes which are fitted into the sides of case ($b$) as represented in Fig. 1.

($d$) is the driving wheel the axle of which is secured to the side of case ($b$); ($e$) is the pinion and is secured to the shaft of the fan or beaters; ($f$) is the heater or cooling vessel and is made of tin or zink and of the form represented in Fig. 4; ($g$) is the strainer or gathering vessel the bottom, sides and ends of which are filled with small holes, and is made in the form represented in Fig. 5; ($r$) are the arms of the beaters ($t$) which are made of prismatic form and have each a number of holes; it will be observed that the arms ($r$) are attached to the shaft ($n$) and the beaters ($t$) are attached to the arms ($r$).

($w$) is the circular part of the fan or beater case and is furnished with two openings marked ($o$) and ($v$).

($x$) is the regulating valve which is operated by the strip ($j$); ($u$) is the conductor which is placed over the openings ($v$) in the circular part of the fan or beater case; ($h$) is the gathering valve which is placed on the sides of the fan case as represented in the drawings (see Fig. 3,) and moves up and down in the slides ($i$).

The fan case is held together by means of small rods and the circular part and sides of it are made of the form represented in the drawings.

Having all the parts made as represented; they are then arranged in the case ($b$) as represented in Fig. 2; the churn being furnished with a lid as represented in Fig. 1, it is ready for use.

The operation of my improved churn is as follows—warm or cold water (as the case may require) is put in the vessel ($f$) at the opening ($y$) after which it is plugged, the milk is then put into the case or reservoir ($b$) and will flow around the heater or cooler ($f$) and the fan case; the valve ($x$) is then regulated so as to allow the desired amount of milk to flow in at the opening ($o$); the gathering valves ($h$) are raised up so as to prevent any flow of milk in at the openings ($s$). Having the valves properly arranged the driving wheel ($d$) is put in motion which will cause the fan or beaters to revolve and the milk will flow in at the opening ($o$) and will be carried around and thrown out at the opening ($v$) into the strainer or gathering vessel ($g$); and when the milk has been sufficiently broken and cut up the valve ($x$) is closed and the valves ($h$) is lowered down so that the openings ($s$) will come opposite to the openings indicated by the dotted lines; the butter which floats on the top of the milk will flow in at the openings ($s$) in the valves ($h$) and will be thrown into the gathering vessel ($g$) by the action of the beaters ($t$); and any milk which may be thrown into the strainer or gathering vessel will run out into the case or reservoir ($b$) thereby separating the butter from the serous part of the milk, the butter which has been thus collected and separated is put up in the usual way—by washing, working, &c.

By my arrangement and by the form of the various parts as herein described and represented, I beat, cut and fan the milk and thereby produce butter in the shortest possible time and effect a most perfect separation of butter from the milk.

Having thus described the nature, construction and operation of my improvement in churns, what I claim as of my invention and desire to secure by Letters Patent of the United States is—

The arrangement of the openings (*o*) and (*v*) in the circular part of the fan or beater case, the valve (*x*), the gathering valve (*h*), the conductor (*u*), the whole being arranged and combined as herein described and represented for the purpose specified.

ANDREW RALSTON.

Witnesses:
JAS. B. JOHNSTON,
JAMES J. JOHNSTON,